(12) United States Patent
Krauss

(10) Patent No.: US 9,471,399 B2
(45) Date of Patent: *Oct. 18, 2016

(54) ORDERABLE LOCKS FOR DISCLAIMABLE LOCKS

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 13/920,588

(22) Filed: Jun. 18, 2013

(65) Prior Publication Data

US 2013/0283282 A1     Oct. 24, 2013

Related U.S. Application Data

(63) Continuation of application No. 13/422,080, filed on Mar. 16, 2012, now Pat. No. 8,495,640, which is a continuation of application No. 12/877,141, filed on Sep. 8, 2010, now Pat. No. 8,495,638.

(51) Int. Cl.
*G06F 9/46* (2006.01)
*G06F 9/52* (2006.01)

(52) U.S. Cl.
CPC .............. *G06F 9/524* (2013.01); *G06F 9/526* (2013.01)

(58) Field of Classification Search
None
See application file for complete search history.

(56) References Cited

U.S. PATENT DOCUMENTS

| | | | |
|---|---|---|---|
| 6,473,820 B1 * | 10/2002 | Zhang | ........................... 710/240 |
| 6,546,443 B1 | 4/2003 | Kakivaya et al. | |
| 6,594,686 B1 | 7/2003 | Edwards et al. | |
| 6,772,153 B1 * | 8/2004 | Bacon et al. | |
| 7,278,141 B2 | 10/2007 | Accapadi et al. | |
| 7,681,197 B1 | 3/2010 | Kinnear | |
| 7,853,951 B2 | 12/2010 | Rosenbluth et al. | |
| 8,495,131 B2 * | 7/2013 | Ahuja et al. | ................... 709/203 |
| 2004/0107227 A1 | 6/2004 | Michael | |
| 2008/0168448 A1 | 7/2008 | Lewis | |
| 2008/0209422 A1 | 8/2008 | Coha | |
| 2009/0235002 A1 | 9/2009 | Nir-Buchbinder et al. | |
| 2010/0005467 A1 | 1/2010 | Shpeisman et al. | |
| 2010/0037086 A1 | 2/2010 | Mellery | |
| 2010/0042584 A1 | 2/2010 | Shavit et al. | |
| 2010/0114849 A1 | 5/2010 | Kingsbury et al. | |
| 2010/0122253 A1 | 5/2010 | McCart | |

OTHER PUBLICATIONS

El-Gwat et al.; "A Novel Scheduling Strategy for an Efficient Deadlock Detection", ICCES International Conference on, Dec. 14-16, 2009, pp. 579-583.

(Continued)

*Primary Examiner* — Wissam Rashid
(74) *Attorney, Agent, or Firm* — Jordam IP Law, LLC

(57) ABSTRACT

Systems and methods of protecting a shared resource in a multi-threaded execution environment in which threads are permitted to transfer control between different software components, for any of which a disclaimable lock having a plurality of orderable locks can be identified. Back out activity can be tracked among a plurality of threads with respect to the disclaimable lock and the shared resource, and reclamation activity among the plurality of threads may be ordered with respect to the disclaimable lock and the shared resource.

21 Claims, 4 Drawing Sheets

(56) References Cited

OTHER PUBLICATIONS

Bensalem et al.; "Confirmation of Deadlock Potentials Detected by Runtime Analysis", ACM Otioco, Portland, Maine, USA, Jul. 17-20, 2006.
Office Action for U.S. Appl. No. 12/877,141, mailed Aug. 29, 2012, 21 pages, United States Patent and Trademark Office.
Notice of Allowance for U.S. Appl. No. 12/877,141, mailed Mar. 22, 2013, 16 pages, United States Patent and Trademark Office.
Office Action for U.S. Appl. No. 13/422,080, mailed Aug. 29, 2012, 22 pages, United States Patent and Trademark Office.
Notice of Allowance for U.S. Appl. No. 13/422,080, mailed Aug. 29, 2012, 15 pages, United States Patent and Trademark Office.

* cited by examiner

ORDERABLE LOCKS FOR DISCLAIMABLE LOCKS

CROSS-REFERENCE TO RELATED APPLICATIONS

The present application is a continuation of U.S. patent application Ser. No. 13/422,080 filed on Mar. 16, 2012, which is a continuation of U.S. patent application Ser. No. 12/877,141 filed on Sep. 8, 2010.

BACKGROUND

1. Technical Field

Embodiments of the present invention generally relate to the use of locks in multi-threaded execution environments. More particularly, embodiments relate to the use of component-specific locks that can be disclaimed, or "backed out" of, by their owning threads and subsequently reclaimed in the order in which they were disclaimed.

2. Discussion

Modern software is typically built from components, wherein it can be advantageous to eliminate the need for individual components to be aware of each other's inner workings The components may reside, however, within a process in which threads holding locks (e.g., thread-safety synchronization objects) can transition program control from one component to another component. Accordingly, the thread-safety aspects of the various software components can become complex.

In particular, components that maintain thread-safe data protected by locks may be at risk in scenarios where those components are free to invoke each other's routines. For example, "deadlocks" can arise when threads holding locks on behalf of one component call into other components, acquire further locks, and then invoke the first component again. This situation can lead to lock acquisitions that are out of the normal order otherwise imposed by each component for any given set of locks. In this scenario, any two threads may be likely to deadlock, sooner or later.

To avoid the deadlock problem, some developers might design their components so as to release any locks acquired on behalf of one component prior to invoking the routines of another component. Conventional locks, however, are not intended to be, or easily, used in such a way. Indeed, locks typically lend themselves to being held throughout a given procedure performed on a given data set. A data set that is protected by a lock may not be amenable to routines that process information across that data set while calling out to other components during that processing. To implement deadlock safety in such a scenario, the lock could be released and reacquired while the data set is traversed. This approach, in turn, can lead to race conditions, typically in unexpected situations where one thread begins accessing the data set while another thread is performing such a release/reacquire cycle.

BRIEF SUMMARY

Embodiments may provide for a computer-implemented method in which a disclaimable lock having a plurality of orderable locks is identified. The method can include tracking back out activity among a plurality of threads with respect to the disclaimable lock and a shared resource. In addition, the method may provide for ordering reclamation activity among the plurality of threads with respect to the disclaimable lock and the shared resource.

Embodiments can also include a computer program product having a computer readable storage medium and computer usable code stored on the computer readable storage medium, where, if executed by a processor, the computer usable code causes a computer to identify a disclaimable lock having a plurality of orderable locks. The computer usable code may also cause a computer to track back out activity among a plurality of threads with respect to the disclaimable lock and a shared resource, and order reclamation activity among the plurality of threads with respect to the disclaimable lock and the shared resource.

Other embodiments can provide for a computer-implemented method in which back out activity is tracked among a plurality of threads with respect to a disclaimable lock having a plurality of orderable locks, wherein tracking the back out activity includes, for each disclaiming thread, receiving a request to back out of the disclaimable lock from the disclaiming thread. An orderable lock can be created in response to each request to back out of the disclaimable lock, wherein the orderable lock may be added to a list of orderable locks associated with the disclaimable lock and designated as a current lock. A recursion count of the current lock may be stored, and a back out event can also be issued for each disclaiming thread. The method may also provide for receiving a request from a current thread to reclaim the disclaimable lock. A determination can be made as to whether the current lock of the disclaimable lock is associated with the current thread if the disclaimable lock is not held by another thread. If the current lock of the disclaimable lock is not associated with the current thread, the current thread may be forced to wait for a reclamation event. If, on the other hand, the current lock of the disclaimable lock is associated with the current thread, a first orderable lock can be removed from the list of orderable locks associated with the disclaimable lock. In addition, a second orderable lock may be designated as the current lock, a recursion count of the current thread can be reinstated, and ownership of the current lock (and thus of the disclaimable lock) can be granted to the current thread. The method may also provide for issuing a reclamation event.

Embodiments can also include a computer program product having a computer readable storage medium and computer usable code stored on the computer readable storage medium, where, if executed by a processor, the computer usable code causes a computer to track back out activity among a plurality of threads with respect to a disclaimable lock having a plurality of orderable locks, wherein the computer usable code to track the back out activity is to, for each disclaiming thread, receive a request to back out of the disclaimable lock from the disclaiming thread. The computer usable code to track the back out activity may also create an orderable lock in response to the request the back out of the disclaimable lock, add the orderable lock to a list of orderable locks associated with the disclaimable lock, designate the orderable lock as a current lock, store a recursion count of the disclaiming thread, and issue a back out event. In addition, if executed, the computer usable code can cause a computer to receive a request from a current thread to reclaim the disclaimable lock, and determine whether the current lock of the disclaimable lock is associated with the current thread if the disclaimable lock is not held by another thread. If the current lock of the disclaimable lock is not associated with the current thread, the current thread may be forced to wait for a reclamation event. If, on the other hand, the current lock of the disclaimable lock is associated with the current thread, a first orderable lock may be removed from the list of orderable locks associated with the disclaimable lock, and a second orderable lock can be designated as the current lock. The computer usable code can also reinstate the recursion count of the current thread, grant ownership of the current lock (and thus of the disclaimable lock) to the current thread, and issue a reclamation event.

BRIEF DESCRIPTION OF THE SEVERAL
VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
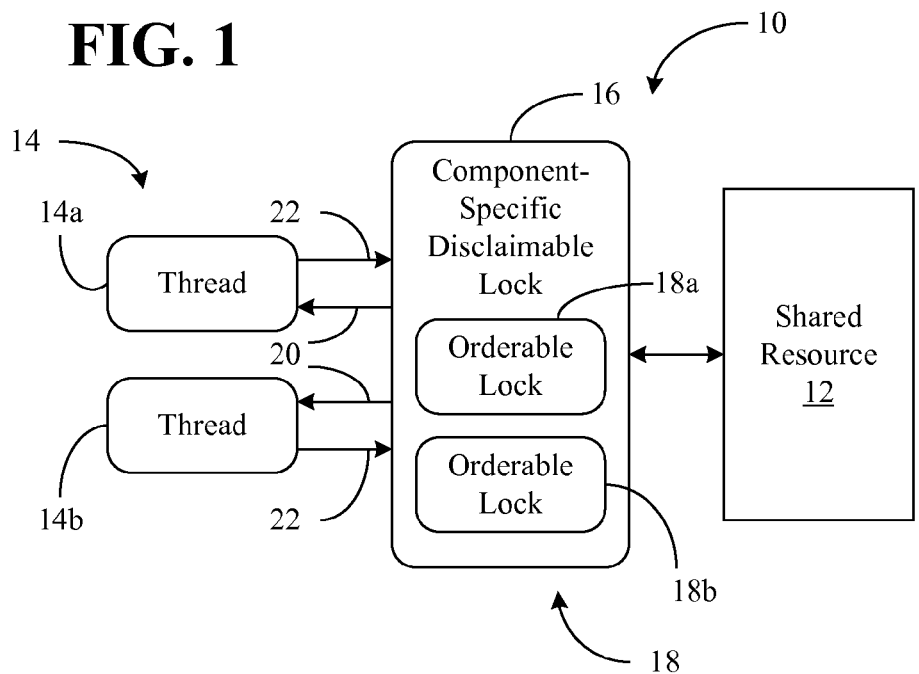
FIG. 1 is a block diagram of an example of a component-specific disclaimable lock that is used protect a shared resource in a multi-threaded execution environment according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme 10 of protecting a shared resource 12 in an execution environment in which a plurality of threads 14 (14a, 14b) can transition program control from one software component to another. In the illustrated example, the scheme 10 uses a component-specific disclaimable lock 16 having a plurality of orderable locks 18 (18a, 18b) to track back out activity 20 and order reclamation activity 22 among the threads 14 with respect to the disclaimable lock 16 and the shared resource 12. Accordingly, if multiple threads 14 back out of the disclaimable lock 16, the lock 16 can ensure that the order in which it is reclaimed is the same order in which it was originally held by the threads 14 before they backed out of it. Moreover, the illustrated approach can minimize race conditions that may otherwise be induced by software component interactions.

Figure 2:
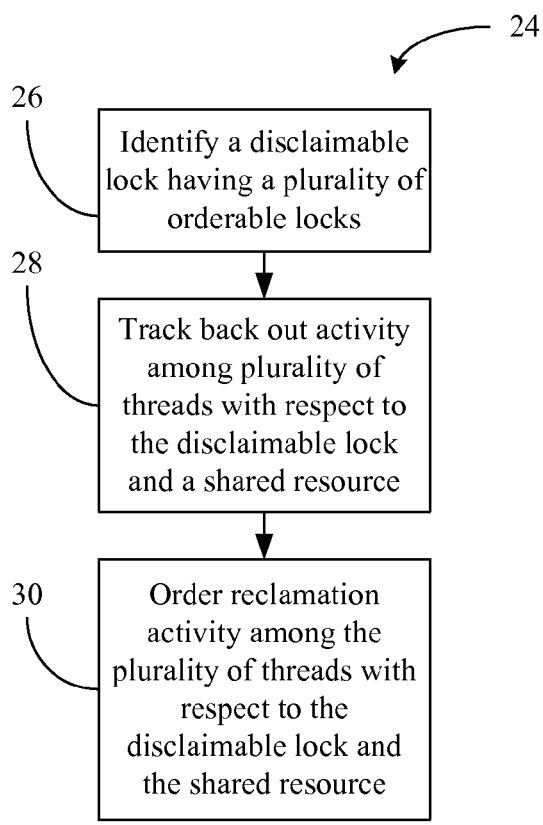
FIG. 2 is a flowchart of an example of a method of using a disclaimable lock to protect a shared resource in a multi-threaded execution environment according to an embodiment.

FIG. 2 shows a method 24 of using a disclaimable lock to protect a shared resource in a multi-threaded execution environment. The method 24 could be implemented in executable software as a set of logic instructions stored in a machine- or computer-readable storage medium such as random access memory (RAM), read only memory (ROM), programmable ROM (PROM), flash memory, etc., as a set of functions explicitly invoked in place of standard OS (operating system) provided API (application programming interface) functions, as a software component that dynamically intercepts such API functions, and so on.

Processing block 26 provides for identifying a disclaimable lock having a plurality of orderable locks. As will be discussed in greater detail, in addition to the plurality of orderable locks, the disclaimable lock may include a mutex (e.g., mutual exclusion lock) to be used in ordinary enter/leave operations affecting the disclaimable lock, and a first event (e.g., "unload event") to be set/issued (e.g., set a bit value designated for thread synchronization) when a component is about to unload, enabling instant release of all component-specific locks and prevention of the component leaving a process in a state in which the process could hang due to a "dangling lock". The disclaimable lock can also include a second event (e.g., "back out event") to be set when a thread backs out of the disclaimable lock, a third event ("reclamation event") to be set when a thread reclaims the disclaimable lock, and other events as appropriate. Back out activity among a plurality of threads can be tracked in block 28 with respect to the disclaimable lock and a shared resource. In addition, illustrated block 30 provides for ordering reclamation activity among the plurality of threads with respect to the disclaimable lock and the shared resource.

As already noted, the method 24 may also involve the detection of an unloading of a software component associated with the disclaimable lock, and initiating a release of the disclaimable lock and the plurality of orderable locks by the plurality of threads in response to the unloading. The initiating can be accomplished simply by setting a single event that is part of (or associated with) a disclaimable lock that is specific to that component. By instantly releasing all component-specific locks, situations in which a component leaves a process in a state in which the process could hang due to a dangling lock can be avoided.

Figure 3:
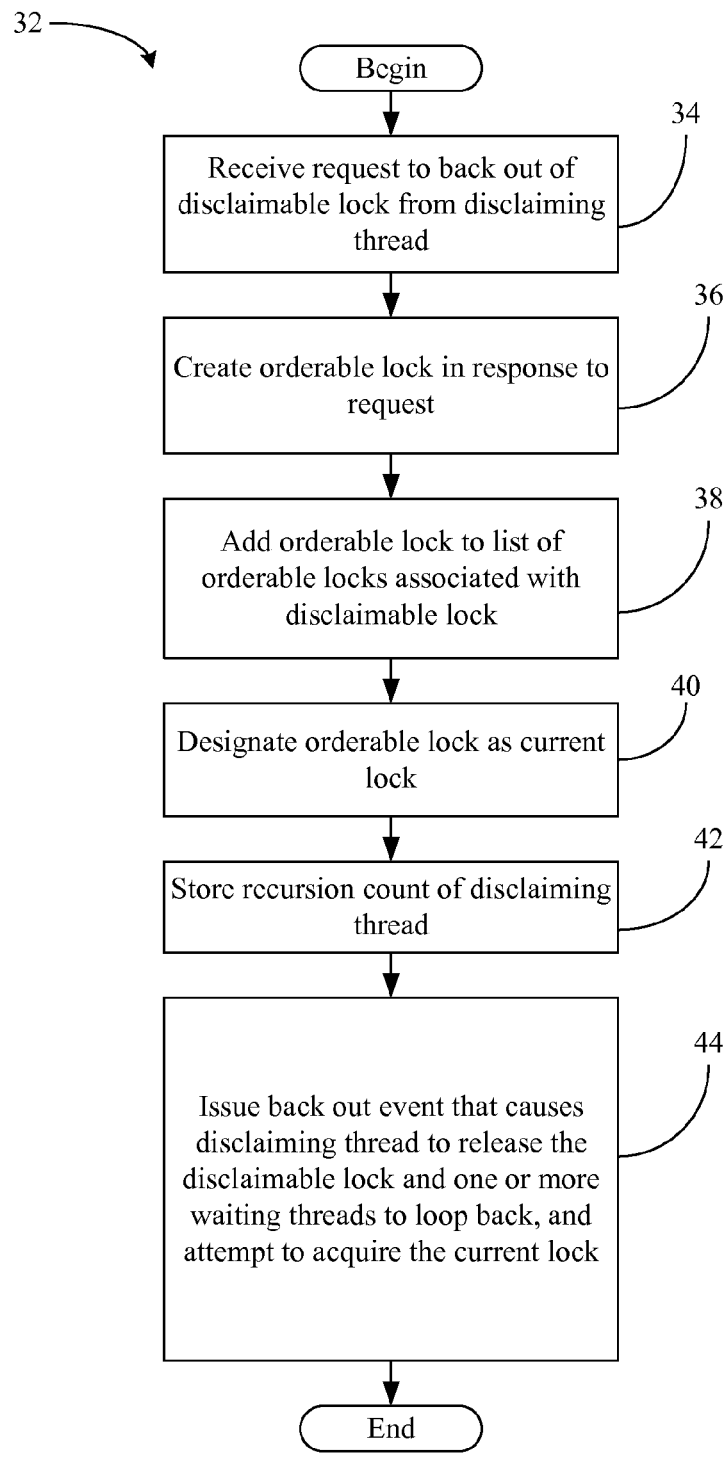
FIG. 3 is a flowchart of an example of a method of tracking back out activity among a plurality of threads with respect to a disclaimable lock and a shared resource according to an embodiment.

Turning now to FIG. 3, one approach to tracking back out activity among a plurality of threads with respect to a disclaimable lock and a shared resource is shown in method 32. Accordingly, portions or all of method 32 may be readily substituted for block 28 (FIG. 2), already discussed. In the illustrated example, a request to back out of a disclaimable lock is received from a disclaiming thread at block 34. In response to the request, an orderable lock can be created at block 36, added to a list of orderable locks associated with the disclaimable lock at block 38, and designated as the "current lock" at block 40. Illustrated block 42 provides for storing the recursion count of the disclaiming thread, wherein the recursion count can indicate the number of times that the thread has recursively acquired the disclaimable lock (i.e. instigated a lock acquisition procedure without instigating a subsequent lock release procedure). The recursion count may therefore be used to ensure that the thread releases the disclaimable lock the same number of times it has acquired the lock. A back out event is issued at block 44, wherein the back out event can cause/instruct the disclaiming thread to release the disclaimable lock and one or more threads that are waiting for the disclaimable lock (e.g., "waiting threads") to loop back, and attempt to acquire the current lock (i.e., the first orderable lock).

Figure 4:
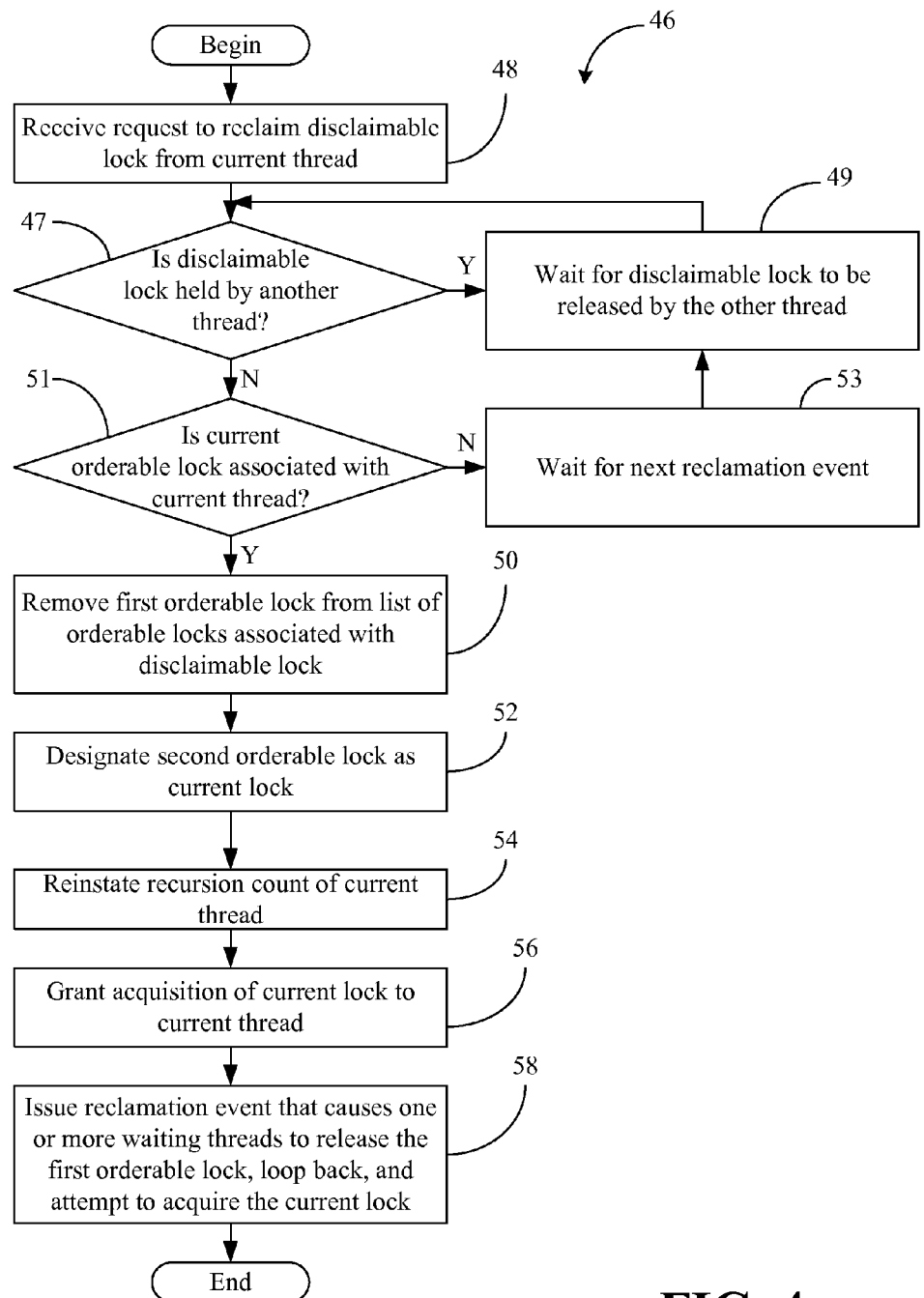
FIG. 4 is a flowchart of an example of a method of ordering reclamation activity among a plurality of threads with respect to a disclaimable lock and a shared resource according to an embodiment.

FIG. 4 shows one approach to ordering reclamation activity among a plurality of threads with respect to a disclaimable lock and a shared resource in method 46. Thus, portions or all of method 46 might be readily substituted for block 30 (FIG. 2), already discussed. In the illustrated example, a request to reclaim the disclaimable lock is received from a thread (e.g., a "current thread") at block 48. If it is determined at block 47 that the disclaimable lock is held by another thread, block 49 provides for waiting for the disclaimable lock to be released by the other thread. Once the disclaimable lock has been released, block 51 may provide for determining whether the current orderable lock (e.g., the "current lock") is associated with the current thread. If not, the current thread can be forced to wait at block 53 for the next reclamation event. As will be discussed in greater detail, each reclamation event can cause the waiting threads to release the most recent current lock, loop back, and attempt to acquire a newly designated current lock.

If it is determined that the current lock is associated with the current thread, block 50 provides for removing a first orderable lock from the list of orderable locks associated with the disclaimable lock, block 52 provides for designating a second orderable lock (e.g., the former current lock) as the current lock, and block 54 provides for reinstating the recursion count of the current thread. Acquisition of the current lock can be granted to the current thread at block 56, wherein illustrated block 58 provides for issuing a reclamation event. In one example, the reclamation event causes/instructs one or more waiting threads to release the first orderable lock, loop back, and attempt to acquire the current lock (i.e., the second orderable lock). Thus, other threads executing the software component's code that is associated with a shared resource protected by the disclaimable lock may behave as though the current thread had never backed out of the disclaimable lock. Ordering of lock reclamation can be accomplished via a synchronization object, such as an event, that is internal to the tracking code of the disclaimable lock's back out/reclamation functions. In addition, another mutex can guard the lock tracking involved in the above-described techniques.

Consider, for example, a scenario in which graphic widgets are tracked in one list, and color schemes for widgets are tracked in another list, wherein the widgets may share color schemes and the lists constitute shared resources. Widgets might be used by a particular software component ("Component 1") as well as by other software components. Moreover, another software component ("Component 2") may be invoked to create and destroy widgets, could hold its own locks unknown to Component 1's developers, and may perform other operations unknown to the developers of Component 1.

In this scenario, Component 1 might have subroutines (e.g., Subroutines "A" and "B") that track widgets, color schemes, and other objects for debugging, analysis, or other tracking purposes. Subroutine A could run after a widget is destroyed and, in addition to removing any destroyed widgets from a widget tracking list, also remove any unused color schemes from a color scheme tracking list. Subroutine B may run in other widget or color scheme update contexts and may simply update the widget tracking list to reflect new members or updated colors for the widgets.

Critical sections might conventionally be employed in Subroutine A to keep its tracking structures consistent, wherein no locks are held in the outer routines of Component 1, since the use of multiple component-specific locks by multiple components could lead to deadlocks during transactions involving either multiple widgets or widget creation or destruction. Thus, the threads may perform the following functions shown in Table I on separate processor cores, approximately at the times described:

TABLE I

| Time | Thread T1 | Thread T2 |
|---|---|---|
| 0 ms | In Component 1, enter routine that destroys a widget | . . . doing unrelated things at this point . . . |
| 0.25 ms | Find the specified widget object | |
| 0.3 ms | Call Component 2's routine to destroy the widget | |
| 0.5 ms | Component 2 destroys the widget and returns | In Component 1, enter routine that updates the color transparency of all widgets via individual widget updates |
| 0.7 ms | Enter Subroutine A that updates widget tracking after widget destruction | |
| 1.05 ms | | Enter Subroutine B that updates widget tracking after widget color updates Subroutine B: |
| 1.06 ms | | Acquire the lock protecting the set of widget objects |
| 1.1 ms | | Walk through all widgets updating their colors, and discover the one that was just destroyed |
| 1.15 ms | | Deallocate the specified widget object, thus forgetting the association between that widget and its color scheme |
| 1.2 ms | | Complete walk through widgets |
| 1.25 ms | | Release the lock protecting the set of widget objects |
| 1.26 ms | Subroutine A: | Return control to Component 1's widget transparency update routine |
| 1.5 | Acquire the lock protecting the set of widget objects | . . . back to doing unrelated things . . . |
| 1.6 | Look up the color code from the specified widget object | |
| 1.8 | Discover that the specified widget object was deallocated | |
| 2.0 | Fail to update color scheme tracking associated with destroyed widget | |
| 2.2 | Release the lock protecting the set of widget objects | |
| 2.3 | Return control to Component 1's widget destruction routine (color scheme tracking still includes a scheme specific to the destroyed widget - amounting to a memory leak) | |

In the above situation, thread T1's failure to update the color scheme tracking associated with a destroyed widget is unresolved under the conventional critical section-based approach, leading to a memory leak. An approach as described herein, on the other hand, could employ component-specific disclaimable locks rather than relying on critical sections, leading to more reliable operation. An example of an associated enhancement is shown below in Table II.

controller 74 and other controllers 76 over one or more other buses 78. The network controller 74 might utilize a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Eth-

TABLE II

| Time | Thread T1 | Thread T2 |
|---|---|---|
| 0 ms | In Component 1, enter routine that destroys a widget | . . . doing unrelated things at this point . . . |
| 0.2 ms | Acquire a disclaimable lock for widget operations | |
| 0.25 ms | Find the specified widget object | |
| 0.26 ms | Back out of the disclaimable lock for widget operations | |
| 0.3 ms | Call Component 2's routine to destroy the widget | |
| 0.5 ms | Component 2 destroys the widget and returns | In Component 1, enter routine that updates the color transparency of all widgets via individual widget updates |
| 0.6 ms | Reclaim the disclaimable lock for widget operations | |
| 0.7 ms | Enter Subroutine A that updates widget tracking after widget destruction<br>Subroutine A: | Wait for the disclaimable lock for widget operations |
| 1 ms | Acquire the lock protecting the set of widget objects | |
| 1.2 ms | Look up widget tracking structure to obtain color code | |
| 1.25 ms | Discover that widget object was deallocated | |
| 1.3 ms | Fail to update color scheme tracking associated with destroyed widget | |
| 1.4 ms | Release the lock protecting the set of widget objects | |
| 1.7 ms | Return control to Component 1's widget destruction routine | |
| 1.8 ms | Release the disclaimable lock for widget operations | |
| 2 ms | . . . doing unrelated things after this point . . . | Acquire the disclaimable lock for widget operations |
| 2.05 ms | | Enter Subroutine B that updates widget tracking after widget color updates<br>Subroutine B: |
| 2.1 ms | | Acquire the lock protecting the set of widget objects |
| 2.15 ms | | Walk through all widgets updating their colors |
| 2.3 ms | | Release the lock protecting the set of widget objects |
| 2.35 ms | | Return control to Component 1's widget transparency update routine |
| 2.4 ms | | Release the disclaimable lock for widget operations (the color schemes are updated correctly, with no memory leak) |

Thus, with a modest performance impact to the overall set of operations (e.g., 0.1 ms timing difference), the illustrated approach enables the replacement of critical sections with component-specific disclaimable locks that minimize the risk of deadlocks and of race conditions that can in turn lead to difficult-to-diagnose problems such as memory leaks.

Figure 5:
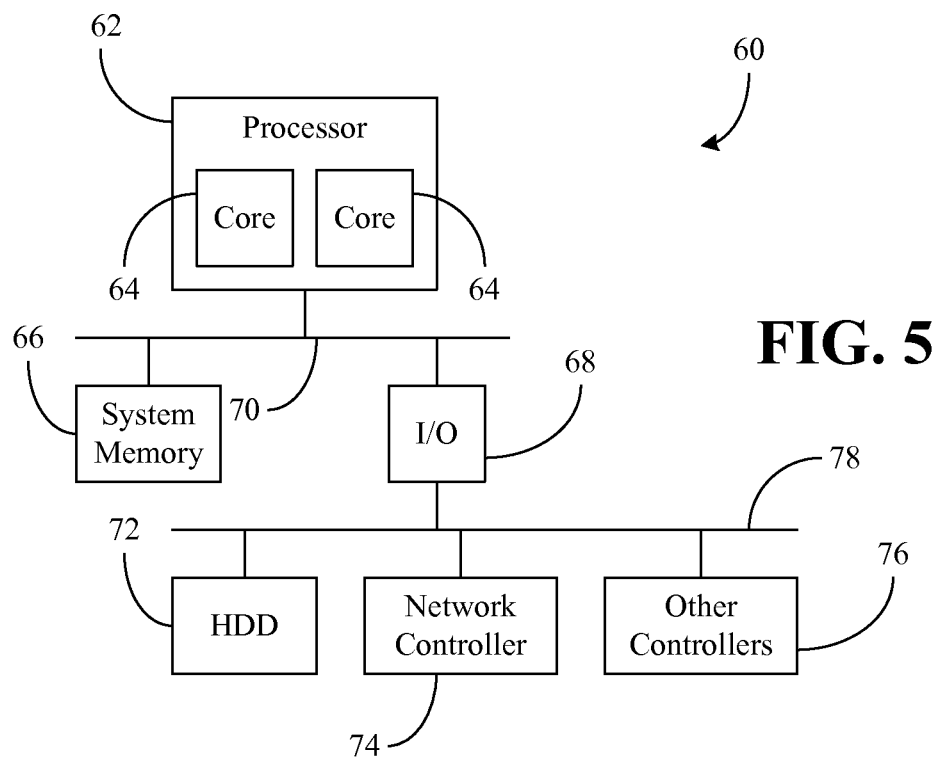
FIG. 5 is a block diagram of an example of a system according to an embodiment.

FIG. 5 shows a computing system 60 having a processor 62 with one or more cores 64 as well as other components such as instruction fetch units (not shown), internal caches (not shown), etc. The illustrated processor 62 is coupled to system memory 66 and an I/O (input/output) device 68 via a bus 70, wherein the I/O device 68 may provide a communication path to an HDD (hard disk drive) 72, network ernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., to enable access to additional off-platform resources.

The cores 64 may be configured to execute various software components such as OS and/or application components with multiple threads according to the particular circumstances. Moreover, the threads may share the internal cache(s) (not shown) of the processor 62, the system memory 66, the memory space of the HDD 72, and other resources such as an SSD (solid state disk, not shown), network resource, etc., wherein locks can be used to protect the shared resources. Accordingly, the system 60 may be configured to identify a disclaimable lock having a plurality of orderable locks, track back out activity among a plurality of threads with respect to the disclaimable lock and a shared resource, and order reclamation activity among the plurality of threads with respect to the disclaimable lock and the shared resource, as already discussed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer program product comprising:
a non-transitory computer readable storage medium; and
computer usable code stored on the non-transitory computer readable storage medium, where, if executed by a processor, the computer usable code causes a computer to:
create an orderable lock for a disclaimable lock in response to a request to release the disclaimable lock, wherein the request is made by a disclaiming thread that holds the disclaimable lock;
instruct the disclaiming thread to release the disclaimable lock when the orderable lock is created;
cause one or more threads that are waiting for the disclaimable lock to attempt to acquire the orderable lock when the disclaimable lock is released;
determine, if the disclaimable lock is not held by a thread, whether a current thread that attempts to acquire the orderable lock is associated with the orderable lock, wherein the current thread is associated with the orderable lock if it is the disclaiming thread; and
grant acquisition of the orderable lock to the current thread if the current thread is associated with the orderable lock.

2. The computer program product of claim 1, wherein the computer usable code, if executed, further causes a computer to designate the orderable lock as a current orderable lock to be acquired.

3. The computer program product of claim 1, wherein the computer usable code, if executed, further causes a computer to store the orderable lock in a list of orderable locks for the disclaimable lock.

4. The computer program product of claim 1, wherein the computer usable code, if executed, further causes a computer to store the orderable lock as a first orderable lock in a list of orderable locks for the disclaimable lock.

5. The computer program product of claim 1, wherein the computer usable code, if executed, further causes a computer to force the current thread to wait for the disclaimable lock to be released by the thread if the disclaimable lock is held by the thread.

6. The computer program product of claim 1, wherein the computer usable code, if executed, further causes a computer to designate another orderable lock as a current orderable lock in a list of orderable locks for the disclaimable lock if the current thread is associated with the orderable lock.

7. The computer program product of claim 1, wherein the computer usable code, if executed, further causes a computer to remove the orderable lock from a list of orderable locks for the disclaimable lock if the current thread is associated with the orderable lock.

8. A computer program product comprising:
a non-transitory computer readable storage medium; and
computer usable code stored on the non-transitory computer readable storage medium, where, if executed by a processor, the computer usable code causes a computer to:
create an orderable lock for a disclaimable lock in response to a request to release the disclaimable lock, wherein the request is made by a disclaiming thread that holds the disclaimable lock;
instruct the disclaiming thread to release the disclaimable lock when the orderable lock is created; and
cause one or more threads that are waiting for the disclaimable lock to attempt to acquire the orderable lock when the disclaimable lock is released.

9. The computer program product of claim 8, wherein the computer usable code, if executed, further causes a computer to designate the orderable lock as a current orderable lock to be acquired.

10. The computer program product of claim 8, wherein the computer usable code, if executed, further causes a computer to store the orderable lock in a list of orderable locks for the disclaimable lock.

11. The computer program product of claim 8, wherein the computer usable code, if executed, further causes a computer to store the orderable lock as a first orderable lock in a list of orderable locks for the disclaimable lock.

12. The computer program product of claim 8, wherein the computer usable code, if executed, further causes a computer to store a recursion count for the disclaiming thread.

13. A computer program product comprising:
a non-transitory computer readable storage medium; and
computer usable code stored on the non-transitory computer readable storage medium, where, if executed by a processor, the computer usable code causes a computer to:

cause one or more threads that are waiting for a disclaimable lock to attempt to acquire an orderable lock when the disclaimable lock is released determine, if the disclaimable lock is not held by a thread, whether a current thread that attempts to acquire the orderable lock for the disclaimable lock is associated with the orderable lock, wherein the current thread is associated with the orderable lock if it is a disclaiming thread that issued a request to release the disclaimable lock and cause the creation of the orderable lock; and grant acquisition of the orderable lock to the current thread if the current thread is associated with the orderable lock.

14. The computer program product of claim 13, wherein the computer usable code, if executed, further causes a computer to force the current thread to wait for the disclaimable lock to be released by the thread if the disclaimable lock is held by the thread.

15. The computer program product of claim 13, wherein the computer usable code, if executed, further causes a computer to designate another orderable lock as a current orderable lock in a list of orderable locks for the disclaimable lock if the current thread is associated with the orderable lock.

16. The computer program product of claim 13, wherein the computer usable code, if executed, further causes a computer to remove the orderable lock from a list of orderable locks for the disclaimable lock if the current thread is associated with the orderable lock.

17. The computer program product of claim 13, wherein the computer usable code, if executed, further causes a computer to remove the orderable lock from a list of orderable locks for the disclaimable lock if the current thread is associated with the orderable lock, the orderable lock being a first orderable lock in the list.

18. A computer program product comprising:

a non-transitory computer readable storage medium; and computer usable code stored on the non-transitory computer readable storage medium, where, if executed by a processor, the computer usable code causes a computer to:

create an orderable lock for a disclaimable lock in response to a request to release the disclaimable lock, wherein the request is made by a disclaiming thread that holds the disclaimable lock;

instruct the disclaiming thread to release the disclaimable lock when the orderable lock is created; and designate the orderable lock as a current orderable lock to be acquired.

19. A computer program product comprising:

a non-transitory computer readable storage medium; and computer usable code stored on the non-transitory computer readable storage medium, where, if executed by a processor, the computer usable code causes a computer to:

create an orderable lock for a disclaimable lock in response to a request to release the disclaimable lock, wherein the request is made by a disclaiming thread that holds the disclaimable lock;

instruct the disclaiming thread to release the disclaimable lock when the orderable lock is created; and store the orderable lock as a first orderable lock in a list of orderable locks for the disclaimable lock.

20. A computer program product comprising:

a non-transitory computer readable storage medium; and computer usable code stored on the non-transitory computer readable storage medium, where, if executed by a processor, the computer usable code causes a computer to:

create an orderable lock for a disclaimable lock in response to a request to release the disclaimable lock, wherein the request is made by a disclaiming thread that holds the disclaimable lock;

instruct the disclaiming thread to release the disclaimable lock when the orderable lock is created; and designate another orderable lock as a current orderable lock in a list of orderable locks for the disclaimable lock if a current thread is associated with the orderable lock.

21. A computer program product comprising:

a non-transitory computer readable storage medium; and computer usable code stored on the non-transitory computer readable storage medium, where, if executed by a processor, the computer usable code causes a computer to:

create an orderable lock for a disclaimable lock in response to a request to release the disclaimable lock, wherein the request is made by a disclaiming thread that holds the disclaimable lock;

instruct the disclaiming thread to release the disclaimable lock when the orderable lock is created; and remove the orderable lock from a list of orderable locks for the disclaimable lock if a current thread is associated with the orderable lock.

* * * * *